United States Patent
Chang et al.

(10) Patent No.: US 7,223,350 B2
(45) Date of Patent: May 29, 2007

(54) PLANARIZATION IN AN ENCAPSULATION PROCESS FOR THIN FILM SURFACES

(75) Inventors: Ping-Wei Chang, San Jose, CA (US); Brad Lee Jackson, San Diego, CA (US); Bulent Nihat Kurdi, San Jose, CA (US); Jennifer Lu, San Jose, CA (US); Dennis Richard McKean, San Jose, CA (US); Eun Kyoung Row, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/109,929

(22) Filed: Mar. 29, 2002

(65) Prior Publication Data

US 2003/0184917 A1    Oct. 2, 2003

(51) Int. Cl.
*B44C 1/22* (2006.01)
(52) U.S. Cl. .................................................. 216/22
(58) Field of Classification Search .............. None
See application file for complete search history.

(56) References Cited

U.S. PATENT DOCUMENTS

| | | | |
|---|---|---|---|
| 4,339,522 A | * | 7/1982 | Balanson et al. ........... 430/192 |
| 4,818,658 A | * | 4/1989 | Martin et al. ............... 430/156 |
| 5,095,613 A | | 3/1992 | Hussinger et al. |
| 5,404,256 A | | 4/1995 | White |
| 5,509,554 A | | 4/1996 | Samuelson et al. |
| 5,516,430 A | | 5/1996 | Hussinger |
| 5,617,273 A | | 4/1997 | Carr et al. |
| 5,932,113 A | | 8/1999 | Kurdi et al. |
| 6,372,407 B1 | * | 4/2002 | Liu et al. ................. 430/270.1 |

\* cited by examiner

*Primary Examiner*—Parviz Hassanzadeh
*Assistant Examiner*—Roberts Culbert
(74) *Attorney, Agent, or Firm*—Zilka-Kotab, PC (57) ABSTRACT

A process to reduce step heights in planarization of thin film carriers in an encapsulation system. The improvements include using an adhesive tape having a thinner adhesive thickness and a stiffer tape for the film sealing the encapsulant on the carrier to result in a low step height surface transition between the carrier and the cured encapsulant. The composition of the encapsulant is modified to reduce the shrinkage upon curing of the encapsulant. The encapsulant may include an absorbent that absorbs the irradiation and cause the top surface to harden first compared to the bulk of the encapsulant, and/or a gas-emitting additive that creates gaseous products that expand upon irradiation to thereby reduce the shrinkage of the encapsulant upon curing. Alternatively, irradiation at very low incidence angle relative to the top surface of the encapsulant causes the top surface to harden before the bulk of the encapsulant.

20 Claims, 9 Drawing Sheets

Planarization Step Heights with Modified Encapsulants:
Step Height Data for Nitto and 3M Tapes

| | Nitto Denko V8S (μm) | 3M 6670 (μm) |
|---|---|---|
| Encapsulation as practiced by method of Kurdi et al. | 20-30 | 5-60 |

| DMA (%) | Nitto Denko V8S (μm) | 3M 6670 (μm) |
|---|---|---|
| 0.1 | 18 | - |

| BAMC (%) | Nitto Denko V8S (μm) | 3M 6670 (μm) |
|---|---|---|
| 0.05 | 25 | 4 |
| 0.1 | 12 | 3 |
| 0.15 | 10 | 2 |

| Curcumin (%) | Nitto Denko V8S (μm) | 3M 6670 (μm) |
|---|---|---|
| 0.05 | 22 | 3 |
| 0.1 | 17 | 2.5 |
| 0.15 | 10 | 2 |

FIG. 10

| Additive | Concentrations (%) | Mode of Action | Wavelength |
|---|---|---|---|
| Curcumin | 0.05, 0.1, 0.15 | Absorption | 365 nm, 404 nm, 436 nm |
| BAMC | 0.05, 0.1, 0.15 | Absorption/ Gas Evolution | 365 nm, 404 nm, 436 nm |
| DMA | 0.1, 1.0 | Gas Evolution | 254 nm |

FIG. 11

DMA

FIG. 12

BAMC

FIG. 13

Curcumin

FIG. 14

PLANARIZATION IN AN ENCAPSULATION PROCESS FOR THIN FILM SURFACES

BACKGROUND OF THE INVENTION

1. Field of the Invention

This invention relates generally to preparing thin films for etch patterning. More specifically, the invention relates to preparing thin film substrates and encapsulating material for etch patterning to form the air-bearing surface of a slider.

2. Description of Related Art

Conventional magnetic disk drives are information storage devices that utilize at least one rotatable magnetic media disk with concentric data tracks. They also utilize a read/write transducer for reading and writing data on the various tracks or separate read and write transducers as in the magnetoresistive and giant magnetoresistive heads that have become the trend in the data storage industry as a means of improving data storage density. Disk drives generally also have an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

The recording density of a magnetic disk drive is limited by the distance between the transducer and the magnetic media. One goal of air bearing slider design is to "fly" a slider as closely as possible to a magnetic medium while avoiding physical impact with the medium. Smaller spacings, or "fly heights," are desired so that the transducer can distinguish between the magnetic fields emanating from closely spaced regions on the disk.

In addition to achieving a small average spacing between the disk and the transducer, it is also critical that a slider fly at a relatively constant height. The large variety of conditions that transducers experience during the normal operation of a disk drive can make constancy of fly height anything but a given. If the flying height is not constant, the data transfer between the transducer and the recording medium may be adversely affected.

The manner in which a slider is manufactured and the material the slider is fabricated from can affect fly height. Preferably variations in the physical characteristics of the slider, e.g. due to manufacturing tolerances, should not substantially alter the flying height of the slider. If this result is not achieved, the slider's nominal fly height must be increased to compensate for variations between sliders.

In the past, the processes for defining air bearing surfaces included using a dry-film resist as the etch mask for a single etch step. However, most current air-bearing surface designs use two or more etch steps to provide lower fly heights and better fly height control. Moreover, slider air-bearing designs for lower fly height may incorporate small pads or other features that are difficult to pattern using dry film resists. Liquid resists have much better resolution capability and are preferred for forming the smaller features of the air-bearing design. To process multiple etch designs, an ion milling step and a reactive ion etching step may be used for either of both steps. At certain row spacings the ion milling etch results in redeposited materials being formed on the sides of the rows, which cannot be removed. In addition, the etch profiles obtained after ion milling and reactive ion etching steps have shallow wall profiles which make inspection difficult and affect the flying characteristics of the slider.

U.S. Pat. No. 5,617,273 to Carr, et al. provides the fabrication of a slider in which the head read and write elements protrude out from the air-bearing surface of the slider to allow for closer proximity to the disk. The problem with this design is that the protective carbon overcoat of the slider is removed during the early functioning of the drive, leaving the elements exposed to the drive environment. As a result, corrosion of the elements can occur, which shortens the lifetime of the drive. Corrosion is a leading cause of lower yields for drive components and has become a huge problem as carbon overcoat layers are becoming thinner.

U.S. Pat. No. 5,509,554 to Samuelson, et al. provides the small pads that are necessary for lower fly heights by using imaging methods in which the small pads are attached to larger sacrificial structures. The sacrificial structures must then be removed during the subsequent deep etch step. As a result, all of the areas of the slider that contain the sacrificial structures must be milled to the deepest etch depth. This approach places restrictions on the ABS designers in terms of the placement of deep etch pockets. Many of today's ABS designs could not be fabricated if the methods of this patent were used.

U.S. Pat. No. 5,516,430 to Hussinger provides a planarization procedure that uses alignment fixtures to accommodate liquid resist application. A filled thermoplastic material is then placed on the rows with a substrate on top. The substrate is heated to 400–500° F., causing the encapsulating material (or encapsulant) to melt and flow into the gaps between the rows. The heating process is controlled by maintaining the alignment fixture near ambient temperature to avoid the encapsulant from sticking to the fixture. Sufficient heat is applied to melt the material near the air-bearing surface (ABS) that may contain thermally sensitive transducers.

A disadvantage of using the Hussinger process is the potential for seepage of material onto the air-bearing surface of the slider. The presence of tapers at the leading edge of the slider provides a conduit by which the material can reach the ABS. Contamination of the ABS also causes photoresist imaging and adhesion problems.

Another problem with the Hussinger procedure is the need for pins to isolate the rows and provide constant gaps between rows. Once the planarization method is carried out, the pins are removed, causing holes to exist in the encapsulated carrier. These holes or defects will then affect the uniformity of the resist coating. In the areas of the carrier close to the void and extending in a radial direction outward from the void, there will be severe effects on resist thickness. After patterning and etch, the resist thickness variation will be translated into the ABS pattern in the form of etch profile variation, which will cause differences in fly height. Large differences in fly height are unacceptable because of the effect on head performance; thus, these heads will be discarded, lowering yield. The holes will also contribute to yield loss since sliders near holes will be subjected to redeposition during etch steps. Furthermore, the high temperature requirement for this procedure (400–500° F.) may preclude use of certain thermally sensitive transducers such as giant magnetoresistive sensors, which are used to produce higher density magnetic storage products.

In response to these disadvantages, U.S. Pat. No. 5,932,113 to Kurdi, et al. (hereinafter referred to as the "Kurdi patent") provides a process for preparing an air-bearing slider that uses an adhesive film made by Nikko Dento and an acrylic encapsulating fluid to fill the recesses between the rows during etching. The Kurdi method attempts to eliminate redeposition contamination during etching and to protect the active transducer devices from handling damage. According to the Kurdi patent, thin films to be etched are applied to a carrier, each of the thin films separated by a recess. Each of the thin films may comprise a transducer-laden air-bearing surface (ABS). An adhesive film is then generally applied to the ABS side of the thin films. A fluid is then deposited in the recess, which is held in the recess by the adhesive film. The fluid may then be cured and the adhesive film removed to provide a planar surface. The ABS side of the row may then be coated with an etch mask, the etch mask developed and air bearing surface patterned.

The Kurdi patent discloses the use of Nitto Denko dicing tape and an acrylic encapsulation fluid to partially fill the gaps between rows. However, implementation of the Kurdi patent may give rise to step heights in the planar surface, resulting in large variations in the liquid resist coating thickness, which are problematic for the air-bearing surface patterning process. It could produce indentations of about 30 microns from the air-bearing surface in the gaps that separate rows. Several factors contribute to the formation of such indentations. First, it is the flexibility of the tape that causes the tape to sink due partly to its own weight and lack of stiffness. Second, the shrinkage of the encapsulant also contributes to the increase in the depth of the indentations. These indentations result in step heights of about 30 microns from the air-bearing surface. The relatively large step heights created by the Kurdi process would affect uniformity of the thickness of the resist coating during the etching process.

It is therefore desirable to create methods that provide thin films with improved planarization, and that overcomes the drawbacks in the prior art.

SUMMARY OF THE INVENTION

This invention provides a method to improve the planarization of thin films on a carrier in an encapsulation process to prepare a planar surface for etching. It is the objective of this invention to reduce the step heights over the planar surface. To achieve this objective, this invention utilizes one or more of the following methods: (a) changing the tapes used in the existing processes; (b) modifying the composition of the encapsulating materials ("encapsulant") used in existing processes; and (c) adjusting the irradiation conditions in which the air-bearing surface is prepared.

The invention provides a different adhesive tape to be used during the planarization process. The contribution to the increase of step height as a result of the tape can be minimized when a tape having a thinner adhesive layer is used. Further, the invention replaces the compliant PVC backing in the tapes used in existing processes with a stiffer material backing such as polyethylene terephthalate, or polyethylene or polyethylene copolymers.

Another cause for the creation of the step height is the shrinkage of the acrylic encapsulant during the irradiation process. The invention provides two approaches with respect to modifying the composition of the encapsulant in order to reduce the step height caused by the shrinkage. First, the preferred approach is to include absorbents in the formulation of the encapsulant. The absorbents absorb the irradiation, thus reducing the curing effect. The presence of the absorbents also causes the top surface, which is the first surface of the encapsulant to be exposed to the UV light, to harden first compared to the bulk of the encapsulant. When the top surface hardens first and thus is fixated in its position, the contribution to the increase in step height as a result of the further shrinkage in the bulk of the encapsulant below the top surface will be minimized. The absorbent can be a bleachable or unbleachable dye (such as Curcumin), or it can even be photo-initiators. The second approach is to add a gas-emitting additive into the encapsulant, which will be converted into gaseous products upon irradiation. During the radiation, the additive will expand and form bubbles within the encapsulant, thus reducing the shrinkage of the encapsulant in volume.

Finally, the invention also describes modification of the irradiation conditions, which can reduce the step height as a result of the shrinkage of the encapsulant. Specifically, by irradiating at very low incidence angle relative to the top surface of the encapsulant, the top surface of the encapsulant will be hardened before the bulk of the encapsulant. After the hardening of the top surface of the encapsulant, irradiation at the normal incidence angle can be used to cure the bulk of the encapsulant.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the invention.

The present invention will be described in reference to the planarization of thin films on a carrier in an encapsulation process to prepare a planar surface for etching air bearing surfaces. However, the planarization process of the present invention is also applicable to preparing planar surfaces for other purposes.

U.S. Pat. No. 5,932,113 to Kurdi, et al. (i.e., the "Kurdi patent"), "Low Temperature Encapsulation System," describes an encapsulation process for preparing the air-bearing surface for etch-patterning, including the use of adhesive tapes and encapsulating materials. This patent is fully incorporated by reference herein.

This invention improves on the methodology described in the Kurdi patent by (a) changing the adhesive tapes used; (b) modifying the composition of the encapsulating materials; and (c) adjusting the irradiation conditions, in which the thin film is exposed. The novel improvement claimed in this patent is in the following detailed description, which illustrates a method for preparing the air-bearing surface of a slider modified from the process disclosed in the Kurdi patent.

Generally the method of the invention may be used to pattern any slider used in the hard drive assembly (HDA) in computing systems common in the industry.

Figure 1:
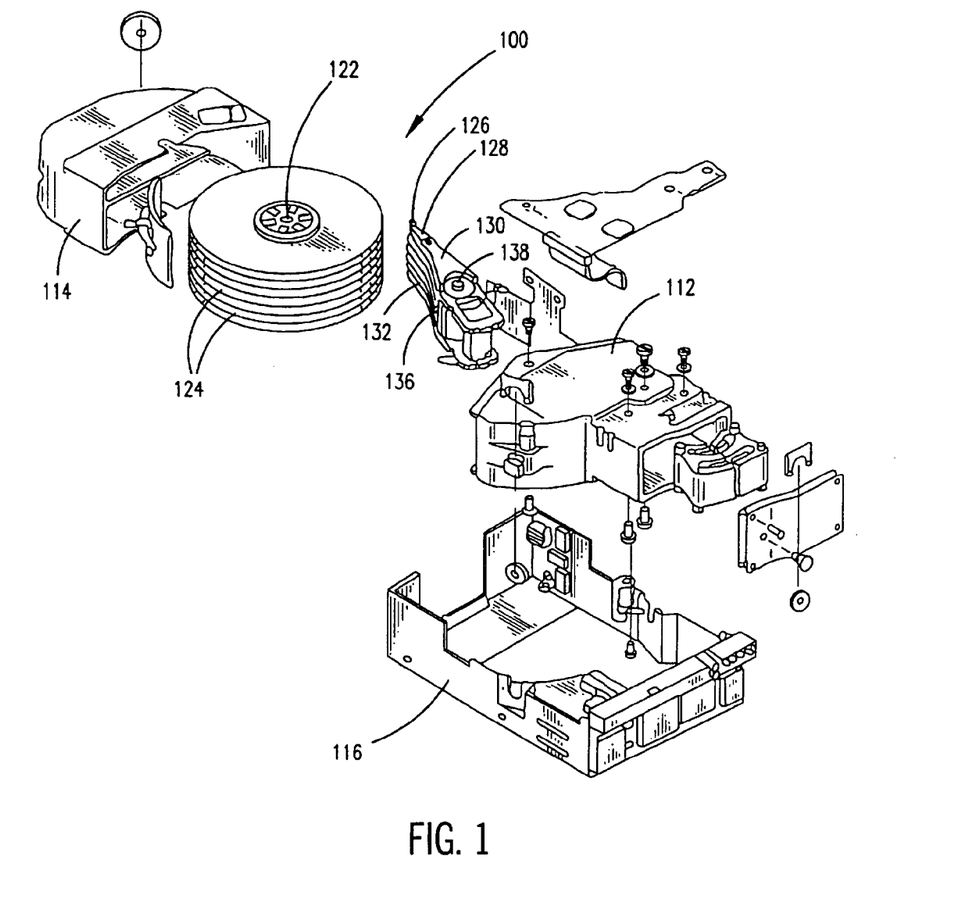
FIG. 1 is an exploded perspective view of an exemplary hard drive assembly including a slider.

As background, an exemplary HDA may be seen in FIG. 1, which is an exploded view of a disk drive 100. The disk drive 100 includes a housing 112 and a housing cover 114, which after assembly is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122, which is powered by a motor.

Information is written on or read from the disks 124 by thin film heads or magnetic transducers, which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

Figure 2A:
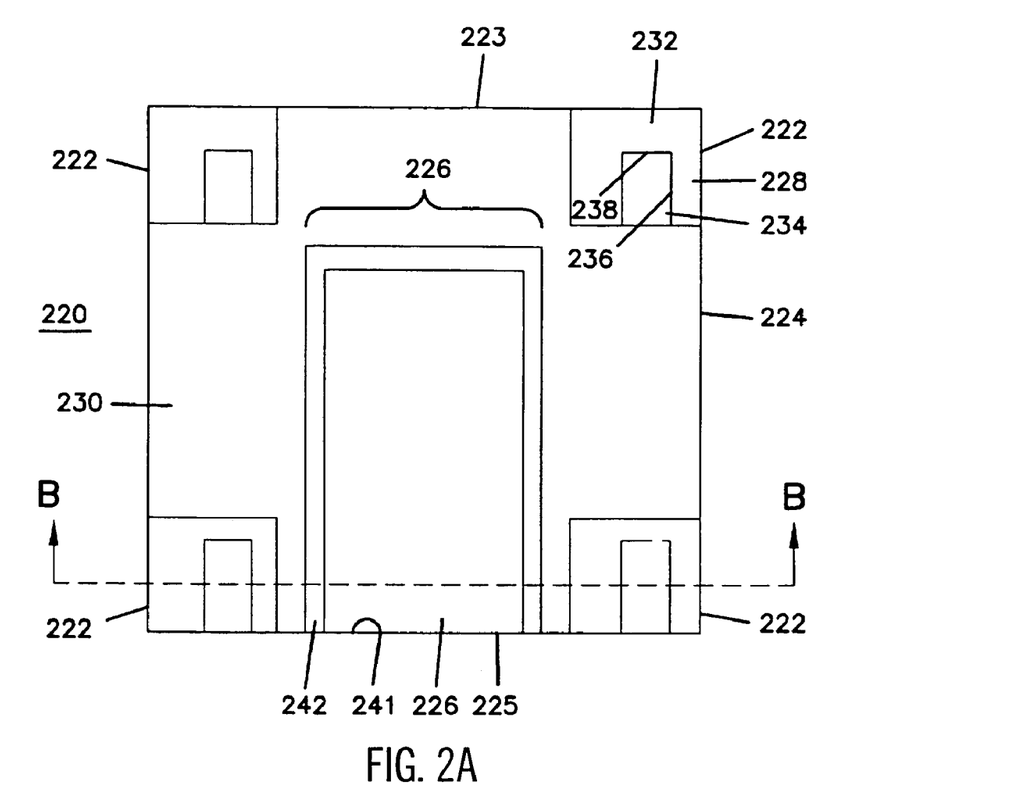
FIG. 2A is a bottom plan view of an exemplary slider.
Figure 2B:
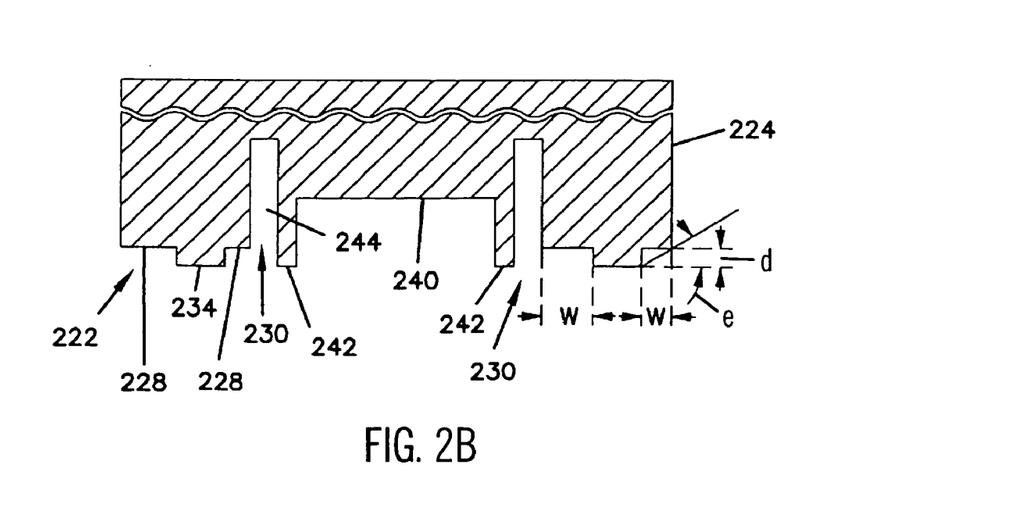
FIG. 2B is a partial cutaway view along axis B—B of the slider depicted in FIG. 2A.

To facilitate the read/write operations of the hard drive assembly, slider design can be intricate, to ensure correct and constant fly height in varying conditions. To fulfill the intended If purpose of the slider, it is often patterned with various reliefs and protrusions to enhance aerodynamic character. For example, FIGS. 2A–2B illustrate a slider design 200 as disclosed in U.S. Pat. No. 5,404,256 issued Apr. 4, 1995 to James W. White, entitled "Transverse and Negative Pressure Contour Gas Bearing Slider," and which is incorporated by reference herein. The slider illustrated in FIGS. 2A–2B is designed to provide uniform and controllable fly height through a range of skew angles.

In FIGS. 2A–2B, traverse pressure contour (TPC) pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes created by two different etch steps.

A negative pressure pad 226 is defined by a substantially planar surface, which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas.

As can be seen, the patterning of the air-bearing surface shown in FIGS. 2A and 2B can be very intricate. The processes of the invention may be used to create the patterning in the air-bearing surface of this slider with reduced redeposition and finer patterning.

Figure 3:
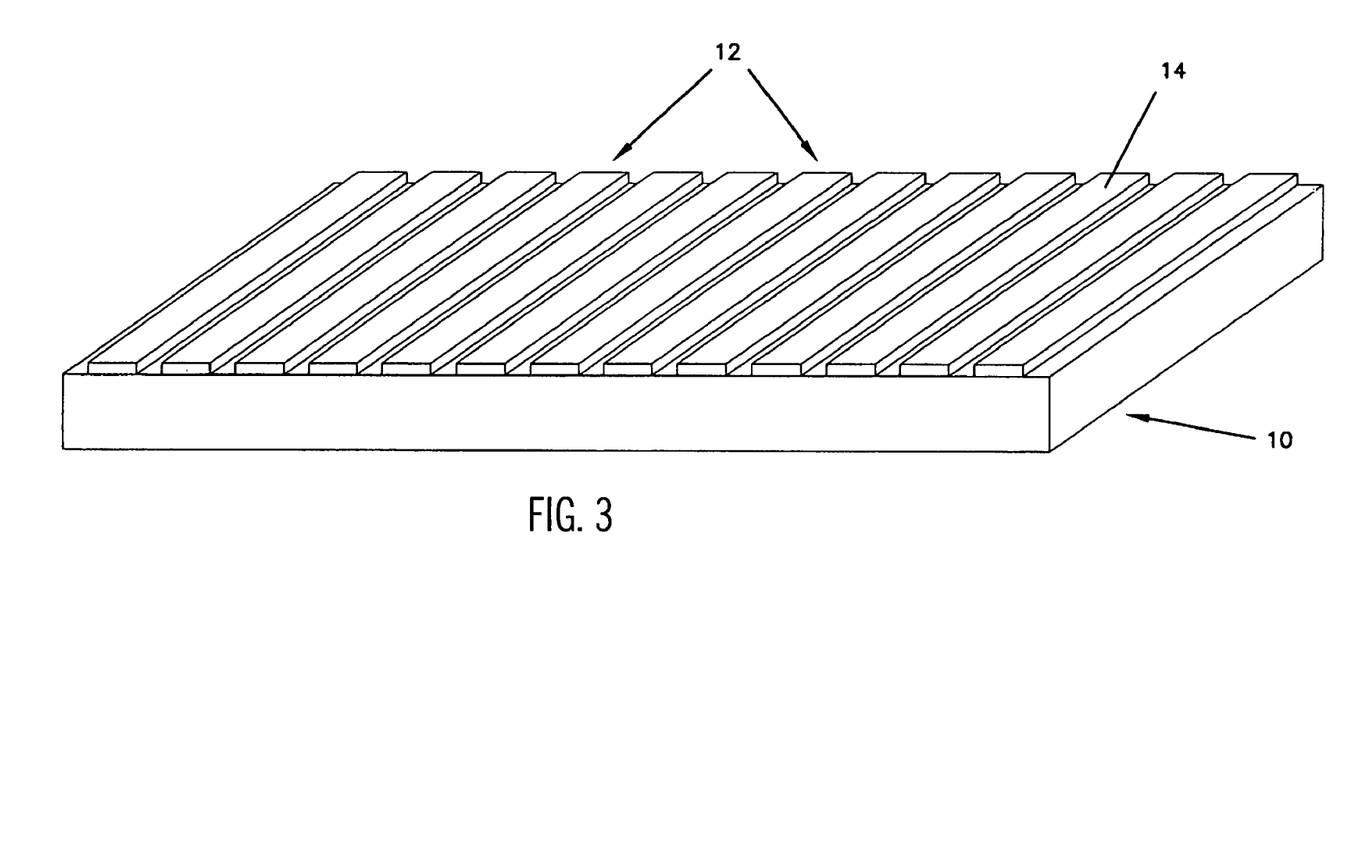
FIG. 3 is a perspective view of a row carrier having rows bonded thereto, air bearing surface side up, according to the invention.

The process of the invention may be used to pattern the exemplary air-bearing surface (ABS) of the slider shown in FIGS. 2A and 2B. In accordance with the invention, a standard row carrier 10 may be used, as seen in FIG. 3. Rows 12 of thin film ABS material may be affixed to the row carrier 10 through any means known to those skilled in the art. In the context of the present invention, a "thin film" may have any appropriate thickness for the intended end-use use application, such as transducer-laden sliders which are initially formed as rows having a thickness of about 300 to 500 microns. The distance between the rows 12 may range from about 300 to 1000 microns and can be as small as about 100 microns or less. The means of attaching the rows 12 includes adhesives that are compatible with other laminates and adhesives used in this invention. In the context of this invention, compatible means that the materials used in the invention, when in contact with each other, function independently and do not affect the function of the other material.

Figure 4:
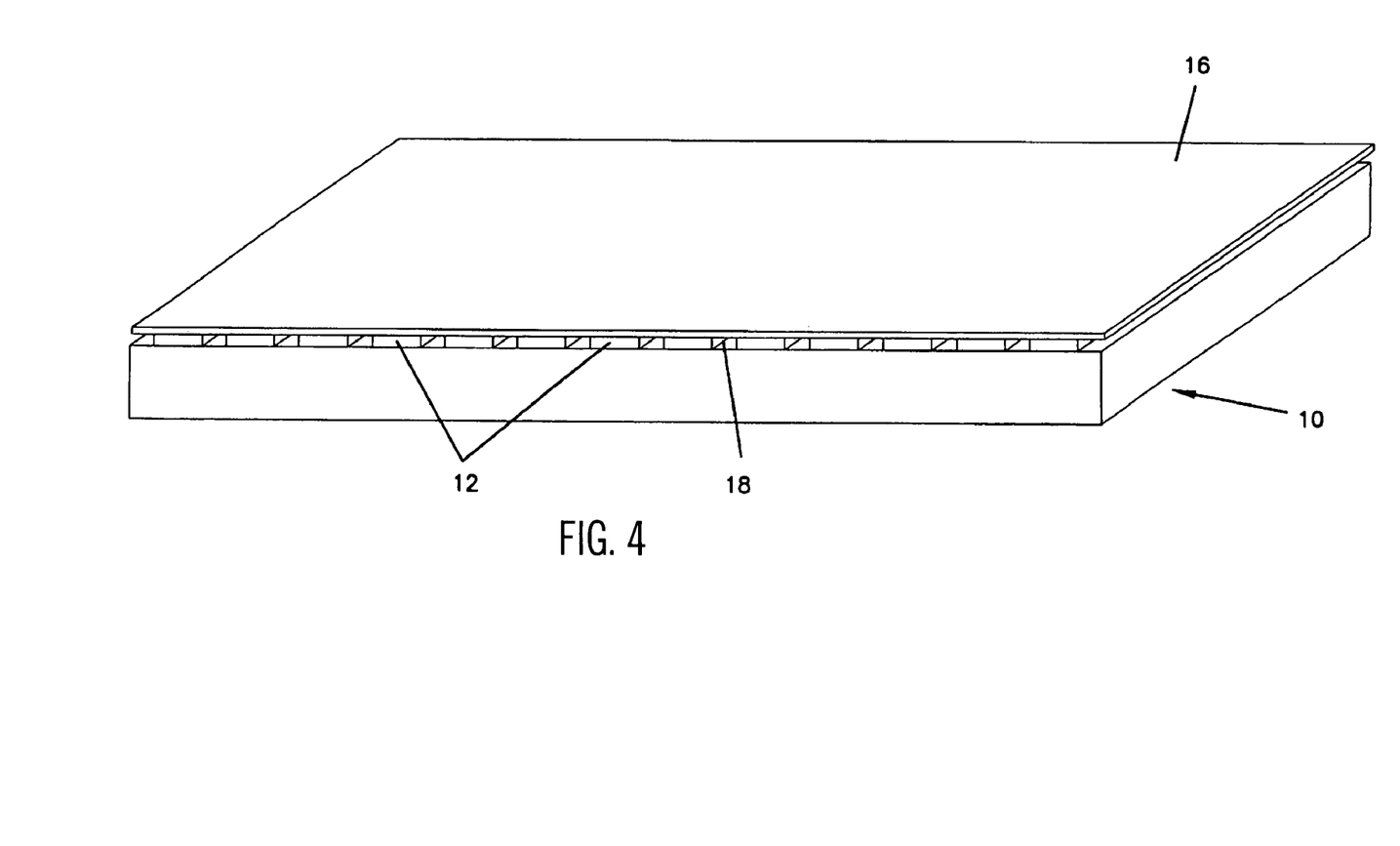
FIG. 4 is a perspective view of the row carrier depicted in FIG. 3 additionally comprising an adhesive film laminated to the ABS side of the rows.

Generally, the rows 12 are attached with the air bearing surface (ABS) 14 side up to allow for the eventual patterning of the ABS side 14. Referring to FIG. 4, an adhesive film 16 is then deposited over the ABS side 14 of the rows 12. The film 16 functions to enclose the cavities or recesses 18 between the rows 12, which are raised in relationship to the recess 18. The film 16 also protects the ABS side 14 from contamination. The film 16 may comprise any composition suitable to enclose the recesses 18 on a carrier 10 and also withstand further processing in accordance with the invention. The depth of recesses 18 depends upon the thicknesses of the thin film rows, generally about 100 to 300 microns.

The adhesive film 16 is generally applied at temperatures ranging from about 25–30° C. and preferably about 25° C. The pressure of application may range from about 10 lbs/cm$^2$ to 50 lbs/cm$^2$ and preferably is about 25 lbs/cm$^2$. Generally, the film 16 comprises a laminate of an adhesive layer and a substrate.

According to one aspect of the invention, since the thickness of the adhesive layer of the film 16 contributes to the step height due to the indentation of the rows into the adhesive layer, improvements can be made by using a tape with a thinner adhesive layer and stiffer tape. With the current technology available, the practical limitation for average adhesive thickness is 4 microns, but may be as thin as 2 microns. This limit is not imposed by the planarization process itself but rather by the availability of reliable tape having uniform adhesive thickness. It is possible to use this process with an adhesive thickness of 2 microns, as disclosed in the Kurdi patent, but at some point it may fail because the protection of the rows would break down and encapsulation fluid would leak onto the surface of the rows. Further, adhesive film with 2 micron average adhesive thickness means that some areas of the film may have no adhesive. It has been found that a 4-micron average adhesive thickness would result in complete adhesive coverage. In addition to the thinner adhesive thickness, a stiff material for the tape substrate such as PET (Polyethylene terephthalate), or polyethylene or polyethylene copolymers is preferred. The net result is that step height otherwise caused by the indentations into the adhesive film is reduced.

Commercially available adhesive films include 3M 6670, which is a PET based film having a 4–5 micron thick adhesive layer, a 35–40 micron thick PET flexible substrate and 70 gm/mm of adhesion. The combination of the 3M 6670 tape and the prior art acrylic encapsulant as practiced by the method of the Kurdi patent gave a result in which step heights are inconsistent, range from 5 to 60 microns over the area of planarization. This result suggests that while step heights may reduce in some areas, step heights may also increase in other areas. However, as discussed below, consistent improved step heights can be achieved by combining modified encapsulant with the 3M 6670 tape.

Figure 5:
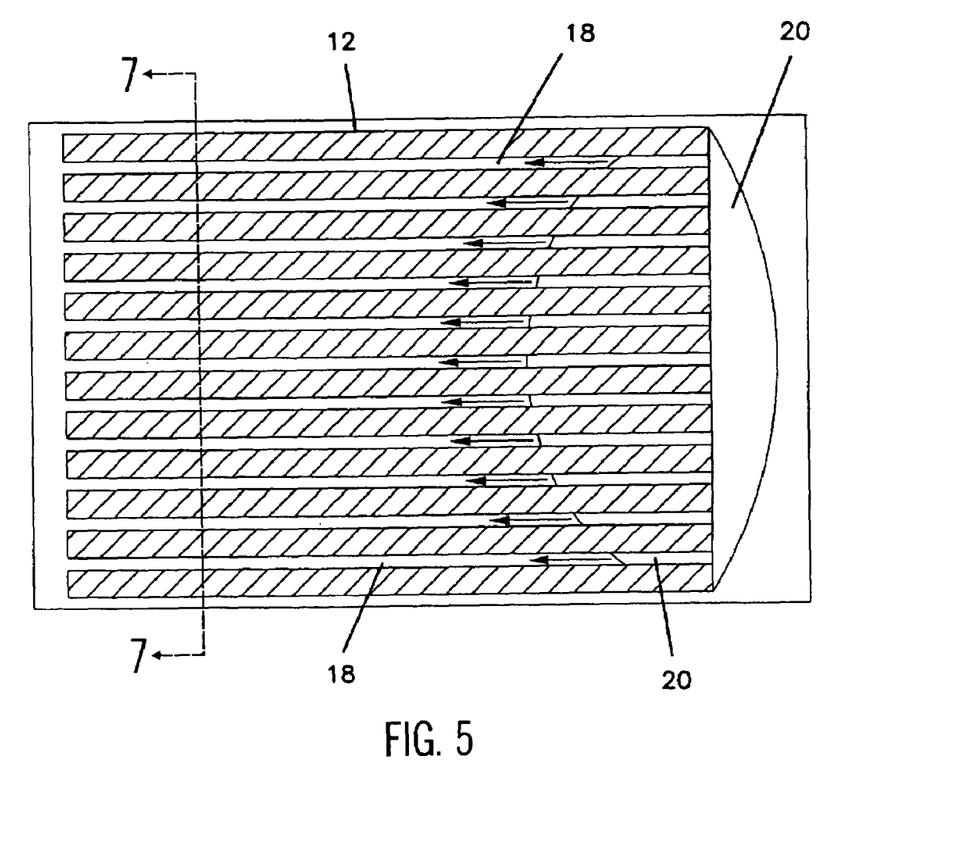
FIG. 5 is a cutaway top plan view of the row carrier depicted in FIG. 4 showing introduction of a fluid into the cavities.

Once the film 16 is put in place, an encapsulant fluid 20 may be injected or drawn into the recesses 18 between the rows 12, as seen in FIG. 5. The row carrier 10 with the fluid 20 can also be seen in the sectional view in FIG. 7. The encapsulant fluid 20 functions to fill the recesses 18 and, once cured, to planarize the rows 12 on the carrier 10. The encapsulant fluid may be selected from the group consisting of a thiol-ene composition, an acrylic composition, an epoxy composition, and mixtures thereof, as referenced in the Kurdi Patent that had been incorporated by reference herein. Examples of encapsulant fluid 20 include Star Technology UV Cure Adhesive M425-1. Additionally, by bringing the level of fluid 20 to substantially the same level as the rows 12 positioned on the carrier 10, a planar landscape is formed across the surface of the carrier 10 in FIG. 6.

According to a second aspect of the invention, in order to reduce the step height, modification of the encapsulant fluid is recommended. The invention provides the solution of adding either an absorbing component (dye), a gas-emitting material, or both, to the encapsulant fluid 20 disposed between the rows 12 of the sliders 126 positioned on a substrate surface to provide a level surface for subsequent photolithography. Adding the dye absorbs light reduces shrinkage of the encapsulant fluid upon irradiation, and adding the gas-emitting material creates gas bubbles that increase the volume of the encapsulant upon irradiation, thereby compensating the shrinkage caused by the irradiation.

Figure 14:
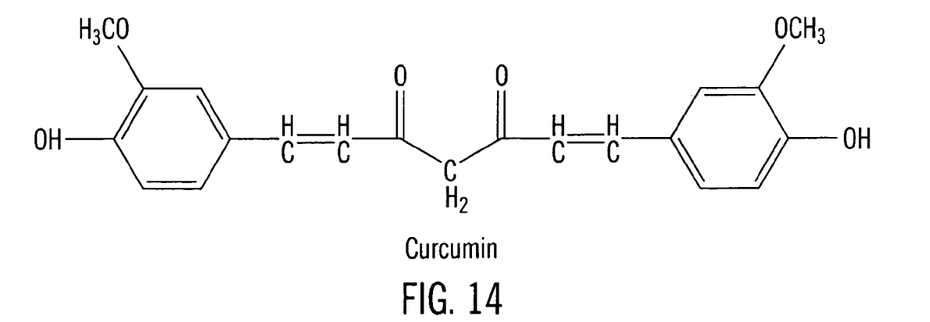
FIG. 14 is a view of the chemical structure of Curcumin.

Generally, the acrylic encapsulant shrinks upon curing by 3–5% in volume, which accounts for the majority of the step height. The preferred approach in modifying the encapsulant fluid to reduce the step height problem is to add an absorbing component in the formulation. This causes the encapsulant to cure initially at the top surface, followed by curing If of the bulk of the film. By hardening the top surface first, further shrinkage is confined to the lower portion of the encapsulant, near the substrate, and step height is not adversely affected. The ultraviolet light-absorbing material can be a bleachable dye, an unbleachable dye, or simply more of the photo-initiator. By adding 0.15% by weight of an unbleachable dye (Curcumin, see FIG. 14) to the acrylic encapsulant, the step height for the Nitto Denko V8S process is reduced from 30 to 10 microns, as seen in FIG. 10, which has planarization step height data for modified encapsulants and tapes.

Figure 12:
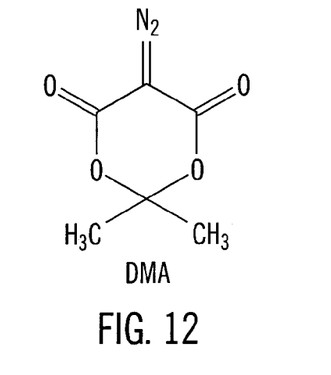
FIG. 12 is a view of the chemical structure of DMA (DiazoMeldrums Acid).

A second approach to improving the encapsulant fluid 20 utilizes the addition of a gas-emitting component designed to alleviate the effects of acrylic crosslinking. These are organic or organometallic additives, which upon irradiation are converted to gaseous products. The addition of this organic material causes expansion, thus an increase in the volume of the encapsulant. An example is DiazoMeldrums Acid (DMA, see FIG. 12), which converts to nitrogen and carbon monoxide and dioxide photochemically. With the addition of 0.1% by weight of DMA, the step height is reduced from 30 to 18 microns for the standard Nitto Denko process, as seen in FIG. 10.

Figure 10:
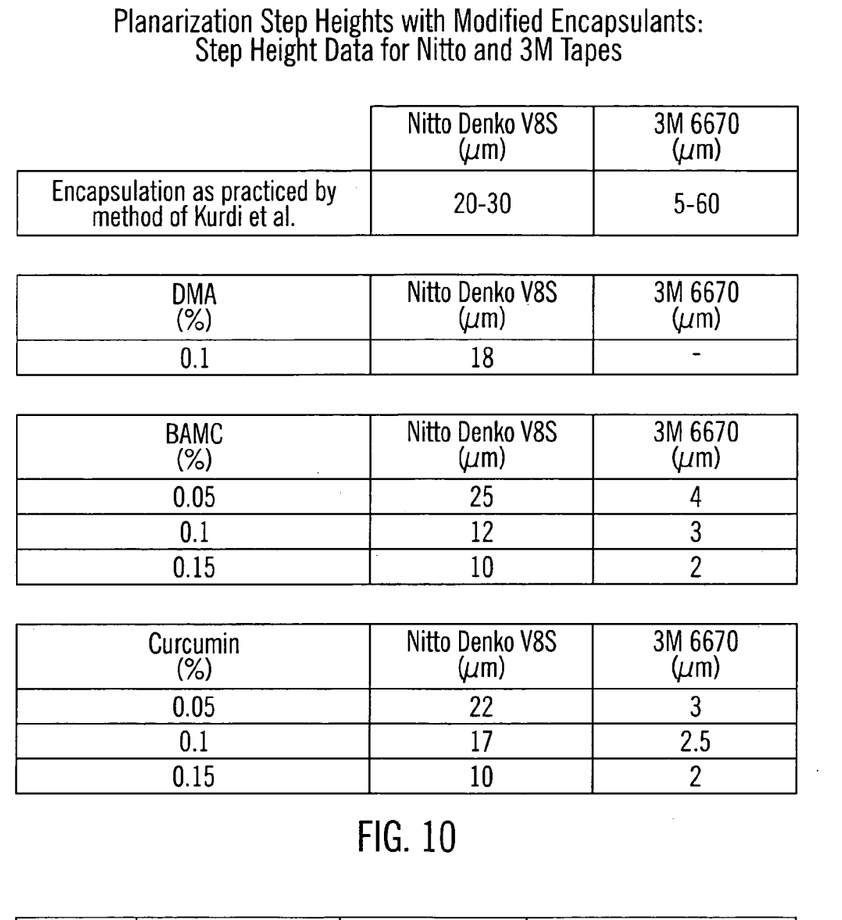
FIG. 10 is a table with planarization step height data for modified encapsulants and tapes.

As shown in FIG. 10, it is demonstrated that better results are obtained when the tape with thin adhesive layer and stiff backing is combined with the modified encapsulant fluid (i.e., DMA, BAMC, and Curcumin additives). FIG. 10 demonstrates the difference in step height when different tapes for different modified acrylic encapsulants of varying concentrations are used. Comparing the 3M 6670 tape to the Nitto Denko V8-S tape, which was recommended in the Kurdi patent, it is shown that the step height is reduced by about 70–80% when the 3M 6670 tape is used for modified encapsulant. In some cases, the step height is reduced to 2 microns from about 30 microns when modification is made to the tape and to the encapsulant fluid. The preferred range of concentrations of the additives in the encapsulants is 0.05%–0.15% by weight for each of DMA, BAMC and Curcumin, with a preferred range of 0.1%–0.12%.

Figure 11:
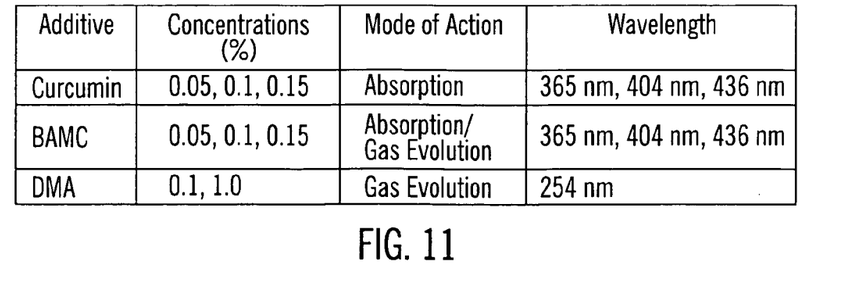
FIG. 11 is a table with concentration, mode of action, and wavelength data for modified encapsulants.
Figure 13:
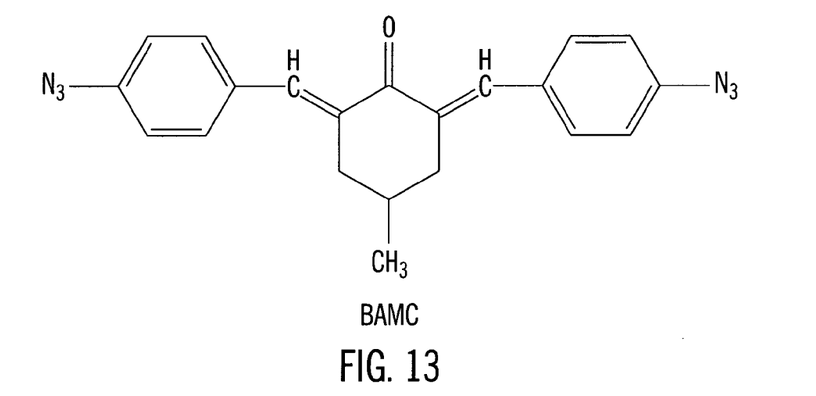
FIG. 13 is a view of the chemical structure of BAMC(2, 6-Bis(4-azidobenzylidene)-4-methylcyclohexanone).

FIG. 11 lists a few recommended additives with recommended concentrations and wavelengths of light commonly used in curing tools. The first additive is 0.05 to 0.15% by weight of Curcumin, which absorbs radiation (see also FIGS. 12–14). The second additive is 0.05 to 0.15% by weight of BAMC(2,6-Bis(4-azidobenzylidene)-4-methylcyclohexanone), which absorbs radiation as well as emitting gas upon radiation. Finally, 0.1% by weight of DMA, which primarily emits gas upon radiation. If the concentration of absorption additive (Curcumin or BAMC) is too low, shrinkage at the top surface will occur, resulting in unacceptable step heights. If the concentration is too high, complete cure of the filler material will be difficult.

Figure 6:
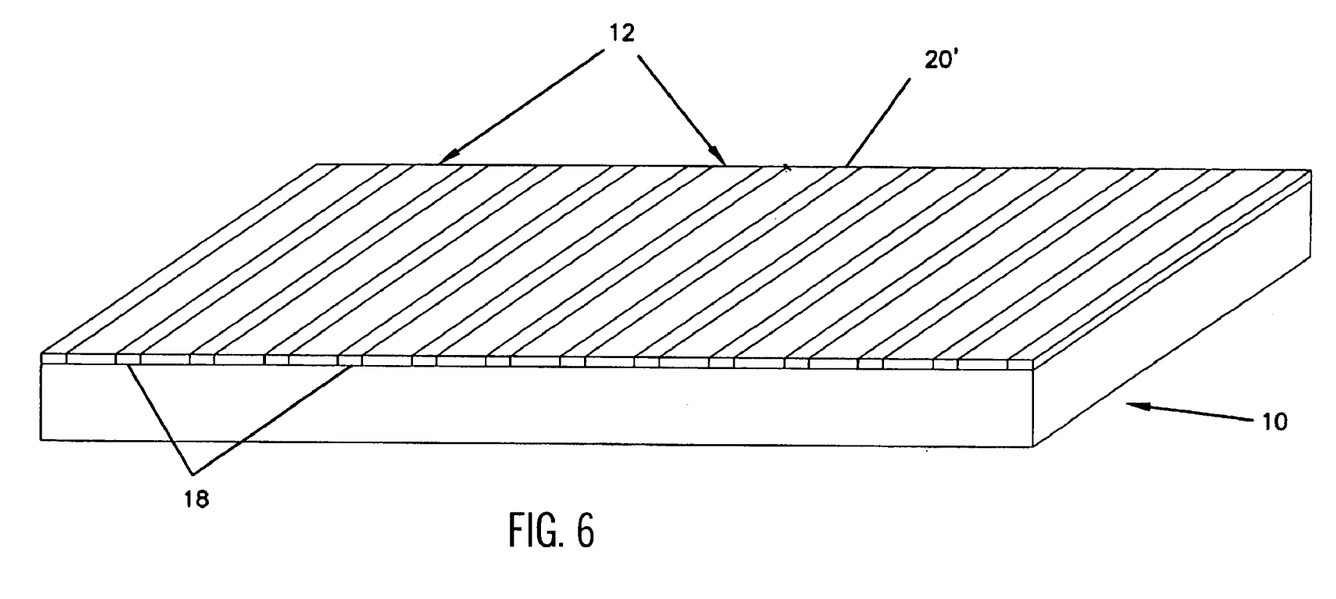
FIG. 6 is a perspective view of the row carrier depicted in FIG. 5, with the adhesion film removed.
Figure 7:
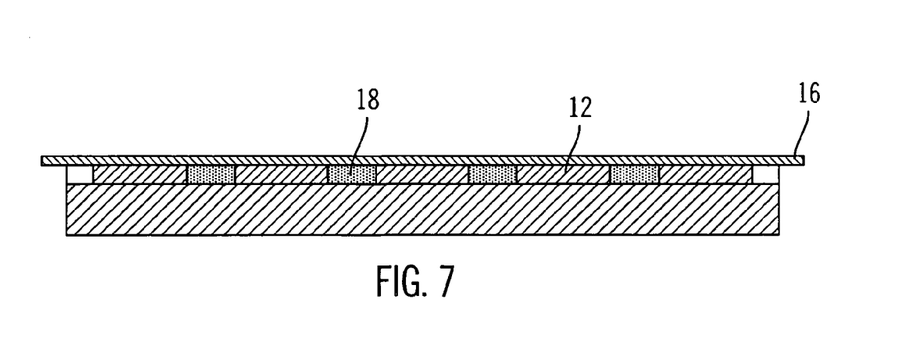
FIG. 7 is a sectional view of the row carrier along line 7—7 in FIG. 5.
Figure 8:
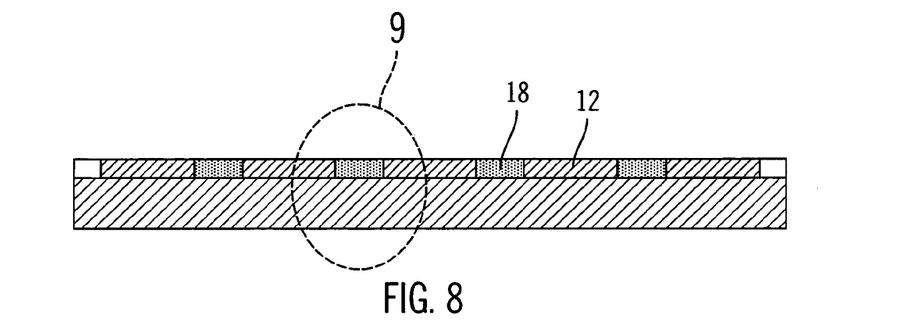
FIG. 8 is a view of the row carrier in FIG. 7 after the adhesive film is removed.
Figure 9:
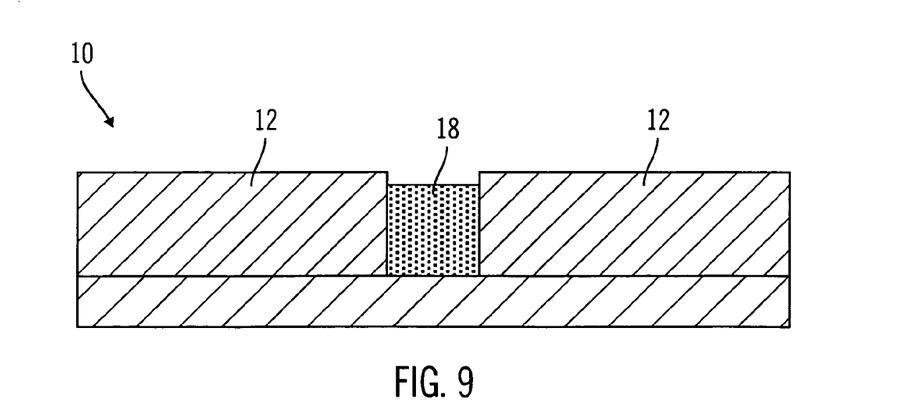
FIG. 9 is an enlarged view of the section 9 in FIG. 8.

Finally, the modified fluid 20 is cured by exposure to ultraviolet irradiation through the adhesive film 16, which converts the fluid 20 to a solid encapsulant, resistant to photoresist solvent and developers. As shown in FIGS. 6 and 8, the removal of the adhesive film 16 gives a nearly planarized carrier 10 with the cured fluid 20' and filled recesses 18 and rows 12, which are produced by a method that is done at ambient temperature and with protection of the ABS surface 14 by the adhesive film 16.

According to a third aspect of the invention, modification of irradiation conditions is implemented. Effects similar to the dyed encapsulant can be obtained by changing the configuration of the irradiation system. By irradiating first at very low incidence angles, referring to light coming from nearly a horizontal direction relative to the carrier, the surface of the encapsulant is hardened initially by the gradient of shrinkage that is created. The low incidence angle of irradiation can be achieved by curing at an angle, which is between 0 and 25 degrees, while maintaining the carrier in a configuration with rows perpendicular to the direction of incident radiation. Following this, the bulk of the film is cured with normal incidence irradiation (at 90 degrees). Using this approach with 3M 6670 tape, carriers with step heights ranging from 3–7 microns can be obtained. Combining this low incidence angle of irradiation with the modified 3M 6670 tape and the "standard" (i.e., Kurdi patent method) encapsulent results in step heights ranging from 5–10 microns. It is to be noted that the low incidence angle of irradiation is not limited to this combination, but other combinations with modified encapsulents can be implemented as well.

After encapsulation, the row carrier 10 is masked, the etch mask is developed, and the ABS side 14 of the rows 12 is patterned.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A method of processing a thin film surface, said thin film surface comprising at least one raised portion bordered by at least one adjacent recess, said method comprising:
    applying an adhesive film to said raised portion, said adhesive film having a stiff substrate that comprises PET (Polyethylene terephthalate);
    depositing a fluid encapsulant into said recess, said encapsulant held in said recess by said film; and
    irradiating and curing said encapsulant,
    wherein said irradiating step comprises the step of irradiating at a first incidence angle relative to the surface of said encapsulant such that the surface of the encapsulant exposed to irradiation hardens before the remaining bulk of the encapsulant.

2. A method of processing a thin film surface, said thin film surface comprising at least one raised portion bordered by at least one adjacent recess, said method comprising:
    applying an adhesive film to said raised portion;
    depositing a fluid encapsulant into said recess, said encapsulant held in said recess by said film; and
    irradiating and curing surface of said encapsulant at a first incidence angle relative to the surface of the encapsulant, substantially between 0 and 25 degrees.

3. A method as in claim 2, further comprising the step of irradiating and curing a bulk of said encapsulant at a second incident angle substantially 90 degrees relative to the surface.

4. A method of processing a thin film surface, said thin film surface comprising at least one raised portion bordered by at least one adjacent recess, said method comprising:
    applying an adhesive film to said raised portion;
    depositing a fluid encapsulant into said recess, said encapsulant held in said recess by said film, said encapsulant comprises an additive that includes at least one of an irradiation activated gas-emitting material and an irradiation absorbing material; and
    irradiating and curing said encapsulant,
    wherein said irradiating step comprises the step of irradiating at a first incidence angle relative to the surface of said encapsulant, substantially between 0 and 25 degrees.

5. The method as in claim 4, wherein said irradiation absorbing material is present in an effective amount to cause the surface of the encapsulant exposed to irradiation to harden before the remaining bulk of the encapsulant for reducing shrinkage of the encapsulant upon curing; wherein said gas-emitting material is present in an effective amount to form bubbles within the encapsulant for reducing shrinkage of the encapsulant during the curing thereof.

6. The method as in claim 5, wherein the irradiation absorbing material is added in the amount of 0.05 to 0.15% by weight.

7. The method as in claim 5, wherein said irradiation absorbing material comprises at least one of a bleachable dye, unbleachable dye and photo-initiator.

8. The method as in claim 7, wherein said unbleachable dye comprises Curcumin.

9. The method as in claim 4, wherein said irradiation absorbing material comprises BAMC (2, 6-Bis (4-azidobenzylidene)-4-methylcyclohexanone).

10. The method as in claim 9, wherein the BAMC is added in the amount of 0.05 to 0.15% by weight.

11. The method as in claim 4, wherein said gas emitting material comprises at least one of organic and organometallic materials.

12. The method as in claim 11, wherein said gas emitting material comprises BAMC (2, 6-Bis (4-azidobenzylidene)-4-methylcyclohexanone).

13. The method as in claim 11, wherein said gas-emitting material comprises DMA (DiazoMeldrums Acid).

14. The method as in claim 13, wherein the DMA is added in the amount of 0.05 to 0.15% by weight.

15. The method as in claim 4, wherein said adhesive film comprises a thin adhesive layer having a substantially 2 to 4 micron adhesive thickness and a stiff substrate that comprises at least one of PET (Polyethylene terephthalate), polyethylene and polyethylene copolymers.

16. The method as in claim 4, wherein said adhesive film comprises about a 4 to 5 micron thick adhesive layer and about a 35 to 40 micron thick PET (Polyethylene terephthalate) substrate.

17. The method as in claim 4, wherein the irradiation at said first incidence angle cures the surface of said encapsulant, said irradiating step further comprises the step of irradiating at a second incidence angle relative to the surface of said encapsulant greater than said first incidence angle to cure the bulk of the encapsulant.

18. The method as in claim 17, wherein said second incidence angle is substantially 90 degrees.

19. The method as in claim 4, wherein said encapsulant is selected from the group consisting of a thiol-ene composition, an acrylic composition, an epoxy composition, and mixtures thereof.

20. The method as in claim 4, further comprising the steps of:
    coating said thin film surface with an etch mask;
    developing said etch mask; and
    etch patterning said thin film surface.

* * * * *